US011954891B2

(12) United States Patent
Chang et al.

(10) Patent No.: US 11,954,891 B2
(45) Date of Patent: Apr. 9, 2024

(54) METHOD OF COMPRESSING OCCUPANCY MAP OF THREE-DIMENSIONAL POINT CLOUD

(71) Applicants: Electronics and Telecommunications Research Institute, Daejeon (KR); IUCF-HYU (Industry-University Cooperation Foundation Hanyang University), Seoul (KR)

(72) Inventors: Eun Young Chang, Daejeon (KR); Euee Seon Jang, Daejeon (KR); Tian Yu Dong, Daejeon (KR); Ji Hun Cha, Daejeon (KR); Kyu Tae Kim, Daejeon (KR); Jae Young Ahn, Daejeon (KR)

(73) Assignees: Electronics and Telecommunications Research Institute, Daejeon (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 254 days.

(21) Appl. No.: 17/363,859

(22) Filed: Jun. 30, 2021

(65) Prior Publication Data
US 2021/0407145 A1    Dec. 30, 2021

(30) Foreign Application Priority Data

Jun. 30, 2020   (KR) ........................ 10-2020-0080607
Jun. 18, 2021   (KR) ........................ 10-2021-0079416

(51) Int. Cl.
*G06T 9/00*       (2006.01)
*G06T 3/40*      (2006.01)
*G06T 7/00*      (2017.01)

(52) U.S. Cl.
CPC ............... *G06T 9/001* (2013.01); *G06T 3/40* (2013.01); *G06T 7/0002* (2013.01)

(58) Field of Classification Search
CPC .......... G06T 9/001; G06T 3/40; G06T 7/0002
See application file for complete search history.

(56) References Cited

U.S. PATENT DOCUMENTS 9,633,473 B2 *  4/2017 Tian ....................... H04N 19/91
10,566,997 B2   2/2020 Lee et al.
(Continued)

FOREIGN PATENT DOCUMENTS

CN   112789861 A  *  5/2021  ............... G06T 7/11
GB   1584422 A  *  2/1981  ......... H04N 1/40068
(Continued)

OTHER PUBLICATIONS

Rajan Joshi et al., [V-PCC] [New Proposal] On occupancy map compression, International Organisation for Standardisation Organisation Internationale De Normalisation ISO/IEC JTC1/SC29/WG11 Coding of Moving Pictures and Audio, ISO/IEC JTC1/SC29/WG11 MPEG2019/m46049, Jan. 2019, Marrakech, MA, Samsung Electronics.

*Primary Examiner* — Charles T Shedrick
(74) *Attorney, Agent, or Firm* — William Park & Associates Ltd.

(57) ABSTRACT

Provided is a method of compressing an occupancy map of a three-dimensional (3D) point cloud, and more specifically, a method of compressing an occupancy map of a point cloud in which an occupancy map image of a point cloud existing in a 3D space is compressed based on a compression quality or a patch-by-patch inspection method of the occupancy map image so that compression distortion is minimized when reconstructing the compressed occupancy map image so as to remarkably improve the quality of a reconstructed occupancy map image.

7 Claims, 16 Drawing Sheets

(56) References Cited

U.S. PATENT DOCUMENTS

| | | | | |
|---|---|---|---|---|
| 11,017,566 | B1* | 5/2021 | Tourapis | G06T 9/001 |
| 2015/0365107 | A1* | 12/2015 | Lee | H03M 13/27 |
| | | | | 714/759 |
| 2019/0087978 | A1* | 3/2019 | Tourapis | G06T 9/001 |
| 2019/0087979 | A1* | 3/2019 | Mammou | H04N 19/597 |
| 2019/0156518 | A1* | 5/2019 | Mammou | G06T 7/0002 |
| 2019/0156519 | A1* | 5/2019 | Mammou | H04N 19/172 |
| 2019/0156520 | A1* | 5/2019 | Mammou | G08B 1/00 |
| 2019/0304139 | A1* | 10/2019 | Joshi | G06T 9/001 |
| 2019/0311500 | A1* | 10/2019 | Mammou | G06T 9/001 |
| 2019/0313110 | A1* | 10/2019 | Mammou | G06T 7/248 |
| 2020/0014953 | A1* | 1/2020 | Mammou | H04N 19/17 |
| 2020/0021847 | A1* | 1/2020 | Kim | H04N 19/597 |
| 2020/0104976 | A1* | 4/2020 | Mammou | G06T 3/40 |
| 2020/0105024 | A1* | 4/2020 | Mammou | H04N 19/597 |
| 2020/0111237 | A1* | 4/2020 | Tourapis | H04N 19/597 |
| 2020/0219290 | A1* | 7/2020 | Tourapis | H04N 19/597 |
| 2020/0314435 | A1* | 10/2020 | Tourapis | G06T 7/74 |
| 2021/0006833 | A1* | 1/2021 | Tourapis | H04N 19/88 |
| 2021/0090301 | A1* | 3/2021 | Mammou | G06T 5/002 |
| 2021/0097723 | A1* | 4/2021 | Kim | G06T 5/002 |
| 2021/0099701 | A1* | 4/2021 | Tourapis | H04N 19/12 |
| 2021/0104013 | A1* | 4/2021 | Hur | G06T 3/40 |
| 2021/0104090 | A1* | 4/2021 | Hur | H04N 13/15 |
| 2021/0209813 | A1* | 7/2021 | Hur | G06T 9/40 |
| 2021/0211703 | A1* | 7/2021 | Kim | H04N 19/597 |
| 2021/0211724 | A1* | 7/2021 | Kim | H04N 19/30 |
| 2021/0217203 | A1* | 7/2021 | Kim | G06T 17/20 |
| 2021/0319571 | A1* | 10/2021 | Oh | G06T 7/60 |
| 2021/0319581 | A1* | 10/2021 | Hur | G06T 7/60 |
| 2023/0045663 | A1* | 2/2023 | Hur | H04N 19/537 |
| 2023/0063575 | A1* | 3/2023 | Huang | G06T 9/20 |
| 2023/0075304 | A1* | 3/2023 | Zhang | G06T 9/001 |

FOREIGN PATENT DOCUMENTS

| | | | | |
|---|---|---|---|---|
| KR | 100991421 | B1 | 11/2010 | |
| KR | 1020140133817 | A | 11/2014 | |
| KR | 1020200007735 | A | 1/2020 | |
| WO | WO-2020146547 | A1 * | 7/2020 | G06T 17/00 |
| WO | WO-2020189943 | A1 * | 9/2020 | |
| WO | WO-2021002592 | A1 * | 1/2021 | G06T 9/001 |
| WO | WO-2021002730 | A1 * | 1/2021 | G06K 9/00597 |
| WO | WO-2021045601 | A1 * | 3/2021 | G06T 17/00 |
| WO | WO-2021045603 | A1 * | 3/2021 | |
| WO | WO-2021141208 | A1 * | 7/2021 | G06T 17/05 |
| WO | WO-2021210867 | A1 * | 10/2021 | |
| WO | WO-2021242064 | A1 * | 12/2021 | G06T 15/00 |
| WO | WO-2021242065 | A1 * | 12/2021 | |
| WO | WO-2021246843 | A1 * | 12/2021 | G06T 17/00 |
| WO | WO-2022015006 | A1 * | 1/2022 | |
| WO | WO-2022019713 | A1 * | 1/2022 | |
| WO | WO-2022035256 | A1 * | 2/2022 | |
| WO | WO-2022075786 | A1 * | 4/2022 | |
| WO | WO-2022092971 | A1 * | 5/2022 | |
| WO | WO-2022098152 | A1 * | 5/2022 | H04N 19/174 |
| WO | WO-2022149810 | A1 * | 7/2022 | G06T 9/00 |
| WO | WO-2022186651 | A1 * | 9/2022 | |
| WO | WO-2022191436 | A1 * | 9/2022 | |
| WO | WO-2022225233 | A1 * | 10/2022 | G06T 9/001 |
| WO | WO-2022240128 | A1 * | 11/2022 | |

* cited by examiner (A)

(B)

(C)

(A)

(B)

(C)

(D)

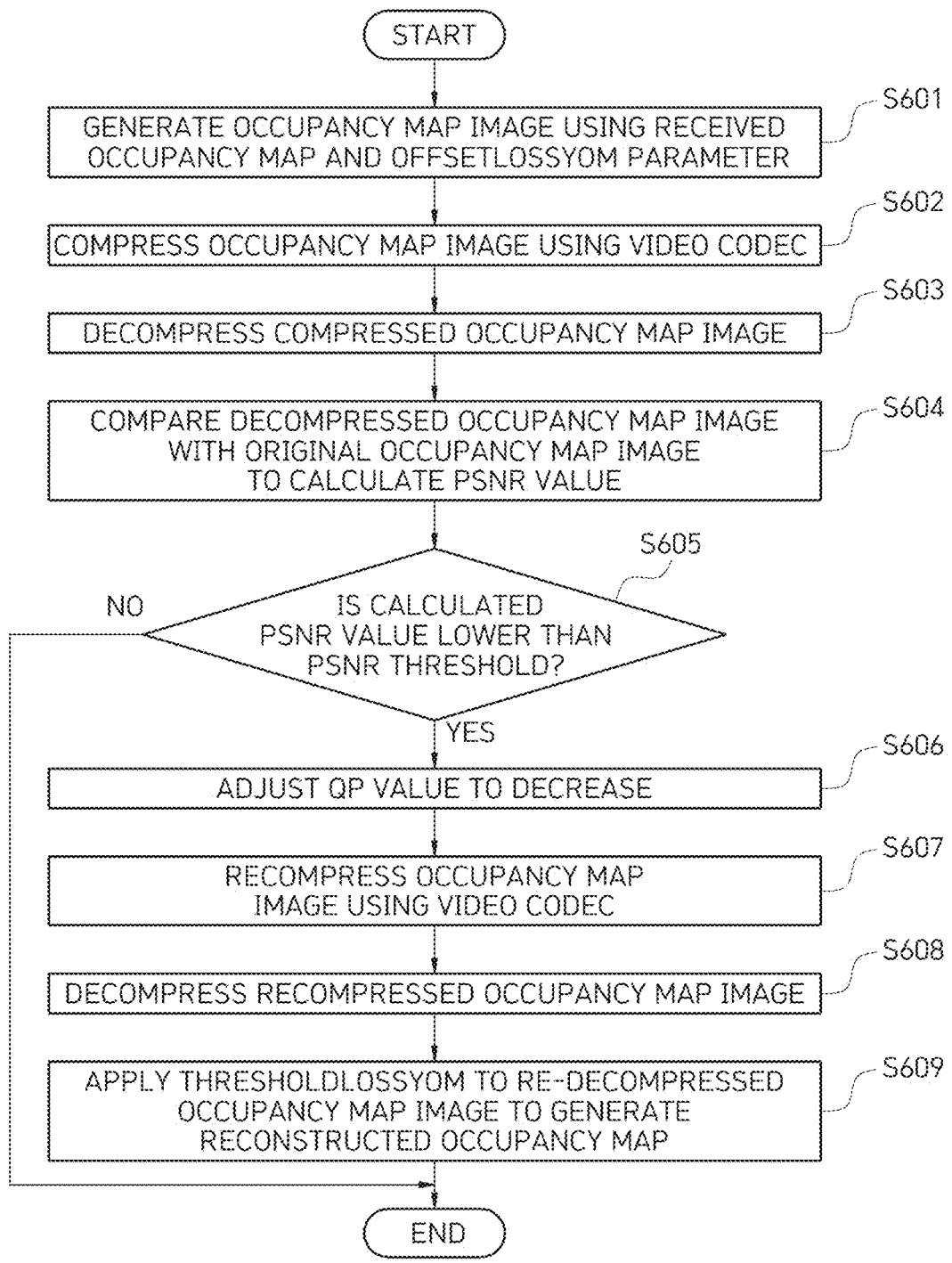

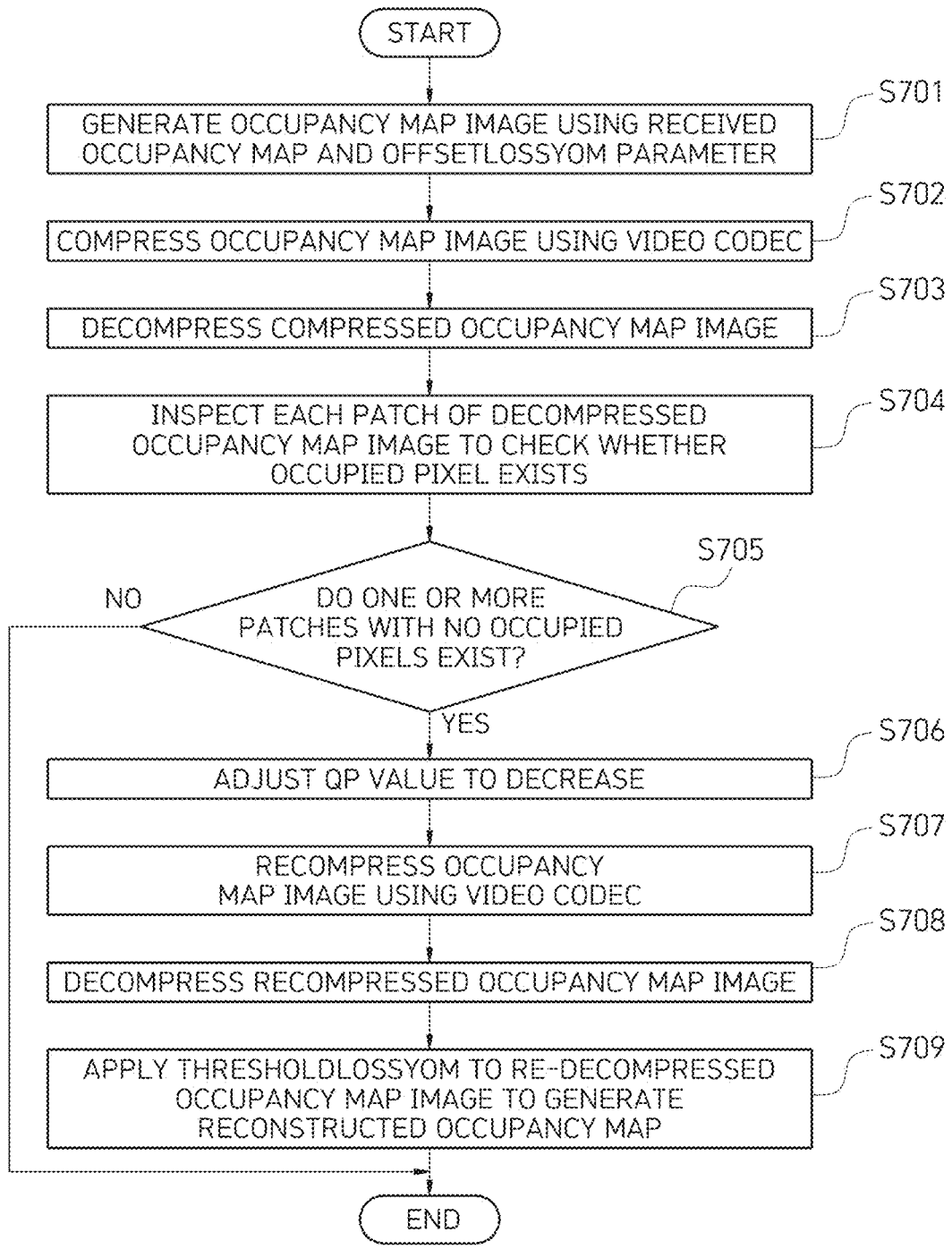

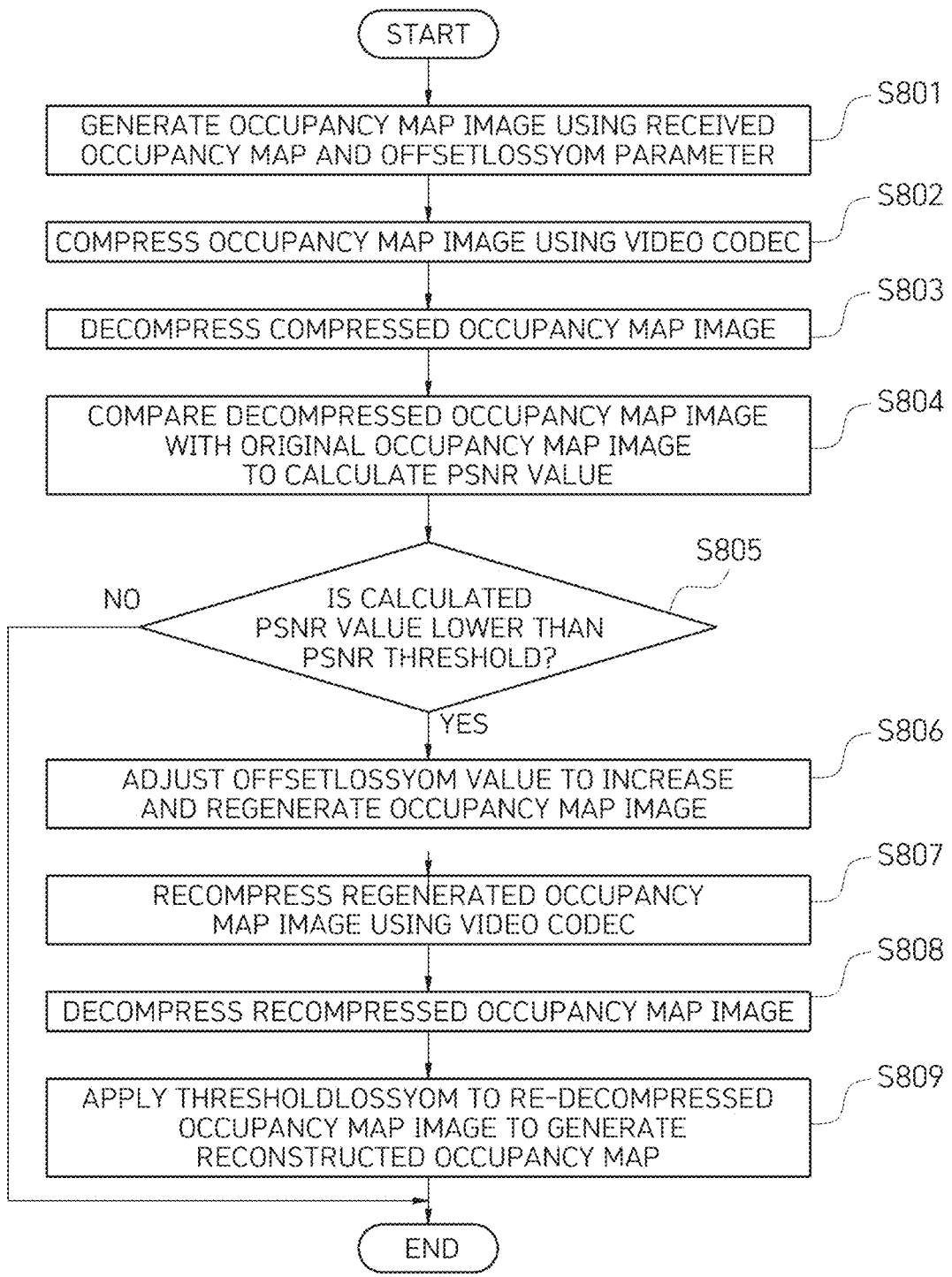

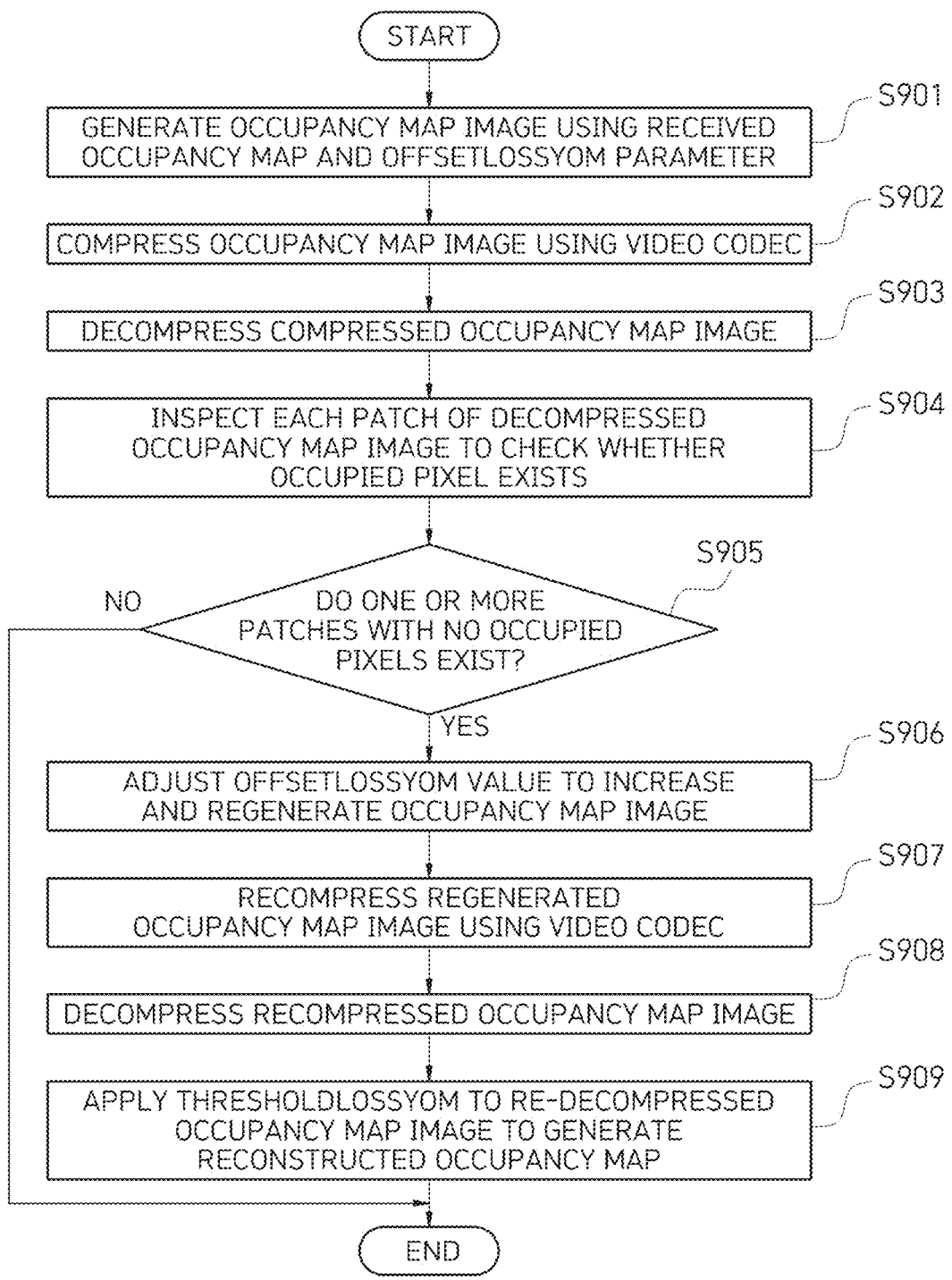

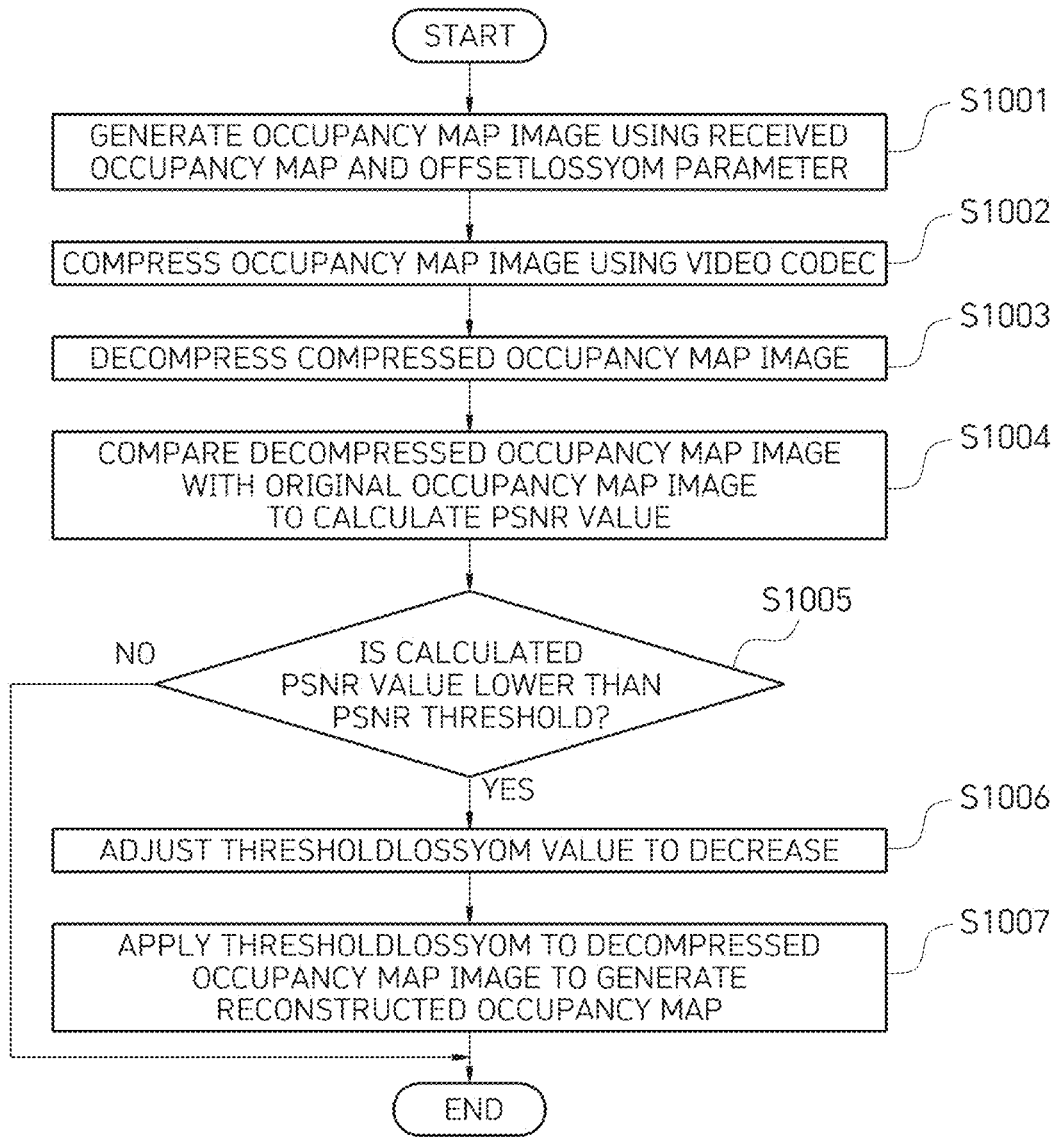

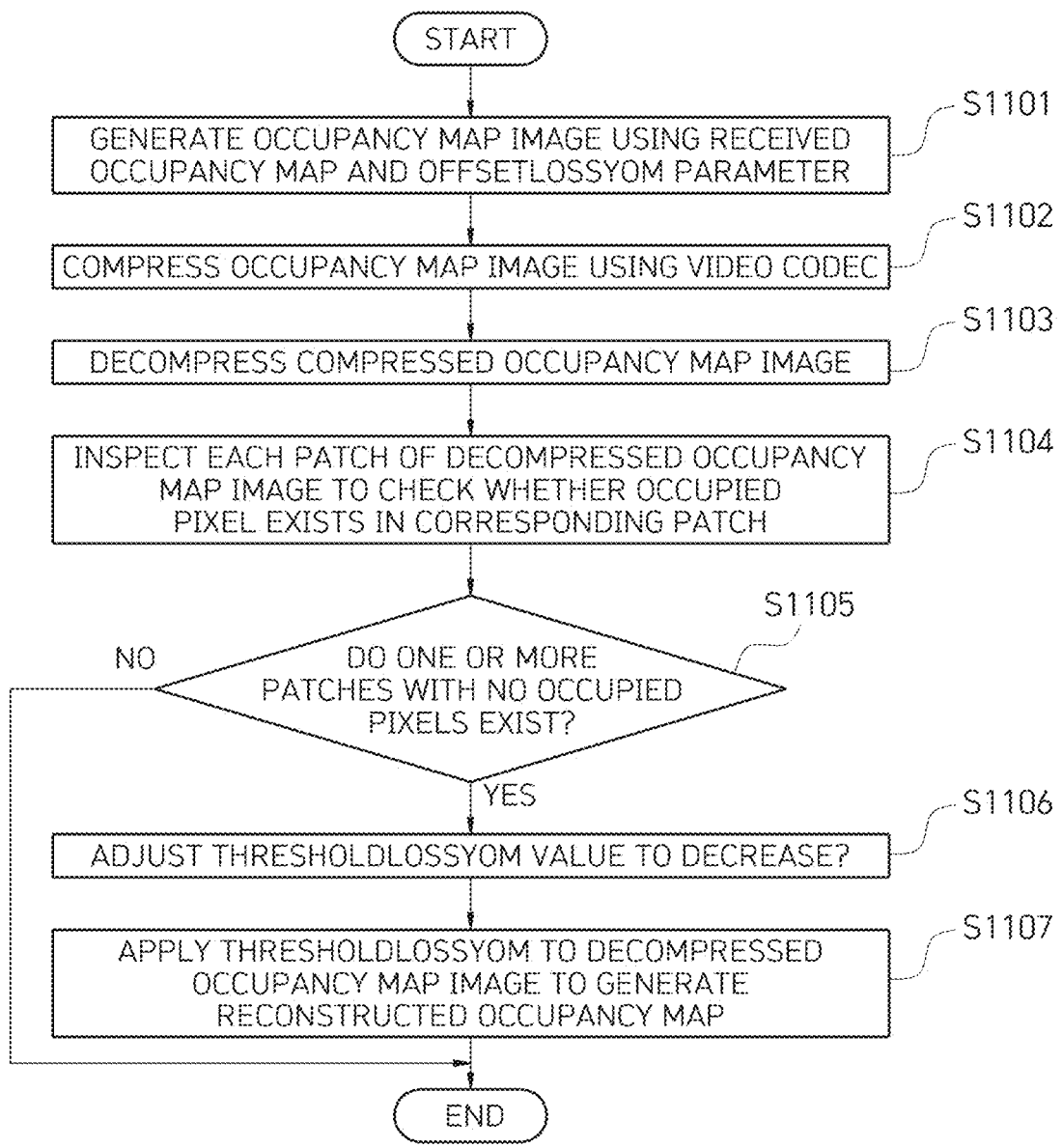

METHOD OF COMPRESSING OCCUPANCY MAP OF THREE-DIMENSIONAL POINT CLOUD

CROSS-REFERENCE TO RELATED APPLICATION

This application claims priority to and the benefit of Korean Patent Applications No. 10-2020-0080607, filed on Jun. 30, 2020, and No. 10-2021-0079416, filed on Jun. 18, 2021, the disclosures of which are incorporated herein by reference in its entirety.

BACKGROUND

1. Field of the Invention

The present invention relates to a method of compressing an occupancy map of a three-dimensional (3D) point cloud, and more specifically, to a method of compressing an occupancy map of a 3D point cloud in which an occupancy map image of a point cloud existing in a 3D space is compressed based on a compression quality or a patch-by-patch inspection method of the occupancy map image so that compression distortion is minimized when reconstructing the compressed occupancy map image so as to remarkably improve the quality of a reconstructed occupancy map image.

2. Discussion of Related Art

In general, Moving Picture Experts Group-Video-based point cloud compression (MPEG V-PCC) is a technology for compression of a three-dimensional (3D) point cloud, and a point cloud (point cloud data) existing in a 3D space is compressed using a video codec.

In this case, in order to minimize the effect of compression distortion, which occurs in a process of compressing an occupancy map, on reconstructing the occupancy map and then compressing a geometry image, there is a need to appropriately set the values of an offsetLossyOM parameter and a thresholdLossyOM parameter.

To this end, the related art (MPEG M46049 input contribution) has proposed recommended values of an OffsetLossyOM parameter and a thresholdLossyOM parameter for compressing an occupancy map by lossy compression in V-PCC compression using High Efficiency Video Coding (HEVC) codec. The V-PCC standard allows various video codecs in addition to HEVC, but when using other video codecs excluding HEVC, such as Essential Video Coding (EVC), Advanced Video Coding (AVC), and Versatile Video Coding (VVC), appropriate setting values for OffsetLossyOM and thresholdLossyOM values are not known, and thus there is no way of predicting a reconstructed result of a compressed occupancy map image.

In addition, a great deal of loss due to compression distortion of the occupancy map may cause an error in which an encoder is stopped during a process of compressing a geometry image. For example, in response to a part of an occupied signal in one patch of the occupancy map disappearing, the encoder operated normally, but in response to occupied signals in all patches of the occupancy map disappearing, the encoder was stopped.

Accordingly, there is a need for a method that is robust to various codecs in a situation in which a compression distortion level is unpredictable and recommended setting values of parameters for each video codec are unknown.

RELATED ART DOCUMENTS

Patent Document

Korean Unexamined Patent Publication No. 10-10-2021-0031456

SUMMARY OF THE INVENTION

The present invention is directed to providing a method of compressing an occupancy map of a three-dimensional (3D) point cloud in which an occupancy map image of a point cloud existing in a 3D space is compressed based on a compression quality or a patch-by-patch inspection method of the occupancy map image so that compression distortion is minimized when reconstructing the compressed occupancy map image so as to thereby remarkably improve the quality of a reconstructed occupancy map image.

The technical objectives of the present invention are not limited to the above, and other objectives may become apparent to those of ordinary skill in the art based on the following description.

According to an aspect of the present invention, there is provided a method of compressing an occupancy map of a three-dimensional (3D) point cloud, the method including the steps of: (a) generating an occupancy map image using occupancy map information, compressing the occupancy map image using a video codec, and decompressing the compressed occupancy map image; and (b) recompressing the occupancy map image generated in the step (a) in consideration of at least one of a compression quality and a patch-by-patch inspection result of the occupancy map image decompressed in the step (a).

The step (a) may include generating the occupancy map image on the basis of an offsetLossyOM parameter indicating an intensity value set for an occupied pixel in the occupancy map.

The step (b) may include, in consideration of the compression quality, comparing the occupancy map image decompressed in the step (a) with the occupancy map image generated in the step (a) to calculate a peak signal-to-noise ratio (PSNR) value, identifying whether the calculated PSNR value is less than a preset PSNR threshold, and when the calculated PSNR value is less than the PSNR threshold, lowering a quantization parameter (QP) value for the decompressed occupancy map image to be less than or equal to a preset value and recompressing the occupancy map image generated in the step (a).

The step (b) may include, in consideration of the patch-by-patch inspection result, inspecting whether an occupied pixel exists for each patch of the occupancy map image decompressed in the step (a) and, in response to existence of a patch having no occupied pixels, lowering a quantization parameter (QP) value for the occupancy map image to be less than or equal to a preset value and recompressing the occupancy map image generated in the step (a).

According to another aspect of the present invention, there is provided a method of compressing an occupancy map of a three-dimensional (3D) point cloud, the method including the steps of: (a) generating an occupancy map image using occupancy map information, compressing the occupancy map image using a video codec, and decompressing the compressed occupancy map image; and (b) regenerating an occupancy map image in consideration of at least one of a compression quality or a patch-by-patch inspection result of the occupancy map image decompressed in the step (a) and recompressing the regenerated occupancy map image.

The step (b) may include, in consideration of the compression quality, comparing the occupancy map image decompressed in the step (a) with the occupancy map image generated in the step (a) to calculate a peak signal-to-noise ratio (PSNR) value, identifying whether the calculated PSNR value is less than a preset PSNR threshold, and when the calculated PSNR value is less than the PSNR threshold, regenerating the occupancy map image by increasing an offsetLossyOM parameter to a preset value and recompressing the regenerated occupancy map image.

The step (b) may include, in consideration of the patch-by-patch inspection result, inspecting whether an occupied pixel exists for each patch of the occupancy map image decompressed in the step (a) and, in response to existence of a patch having no occupied pixels, regenerating the occupancy map image by increasing an offsetLossyOM parameter to a preset value and recompressing the regenerated occupancy map image.

According to another aspect of the present invention, there is provided a method of compressing an occupancy map of a three-dimensional (3D) point cloud, the method including the steps of: (a) generating an occupancy map image using occupancy map information, compressing the occupancy map image using a video codec, and decompressing the compressed occupancy map image; and (b) resetting a thresholdLossyOM parameter to be decreased to a preset value in consideration of at least one of a compression quality or a patch-by-patch inspection result of the occupancy map image decompressed in the step (a).

The step (b) may include, in consideration of the compression quality, comparing the occupancy map image decompressed in the step (a) with the occupancy map image generated in the step (a) to calculate a peak signal-to-noise ratio (PSNR) value, identifying whether the calculated PSNR value is less than a preset PSNR threshold, and when the calculated PSNR value is less than the PSNR threshold, resetting the thresholdLossyOM parameter to be decreased to a preset value.

The step (b) may include, in consideration of the patch-by-patch inspection result, inspecting whether an occupied pixel exists for each patch of the occupancy map image decompressed in the step (a), and in response to existence of a patch having no occupied pixels, resetting the thresholdLossyOM parameter to be decreased to a preset value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a diagram illustrating a method of compressing an occupancy map of a 3D point cloud in a sequential order according to an embodiment of the present invention;

FIG. 7 is a diagram illustrating a method of compressing an occupancy map of a 3D point cloud in a sequential order according to another embodiment of the present invention and shows an example of using a method of recompressing an occupancy map image based on a patch-by-patch inspection;

FIG. 8 is a diagram illustrating a method of compressing an occupancy map of a 3D point cloud in a sequential order according to still another embodiment of the present invention and shows an example of using a method of regenerating and recompressing an occupancy map image based on a compression quality;

FIG. 9 is a diagram illustrating a method of compressing an occupancy map of a 3D point cloud in a sequential order according to yet another embodiment of the present invention and shows an example of using a method of regenerating and recompressing an occupancy map image based on a patch-by-patch inspection;

FIG. 10 is a diagram illustrating a method of compressing an occupancy map of a 3D point cloud in a sequential order according to yet another embodiment of the present invention and shows a method of compressing an occupancy map image based on a compression quality; and FIG. 11 is a diagram illustrating a method of compressing an occupancy map of a 3D point cloud in a sequential order according to yet another embodiment of the present invention and shows a method of compressing an occupancy map image based on a patch-by-patch inspection.

DETAILED DESCRIPTION OF EXEMPLARY EMBODIMENTS

Hereinafter, preferred embodiments of the present invention will be described in order to facilitate understanding of the present invention. However, the following examples are provided only for the purpose of easier understanding of the present invention, and the present invention is not limited by the following examples.

Figure 1:
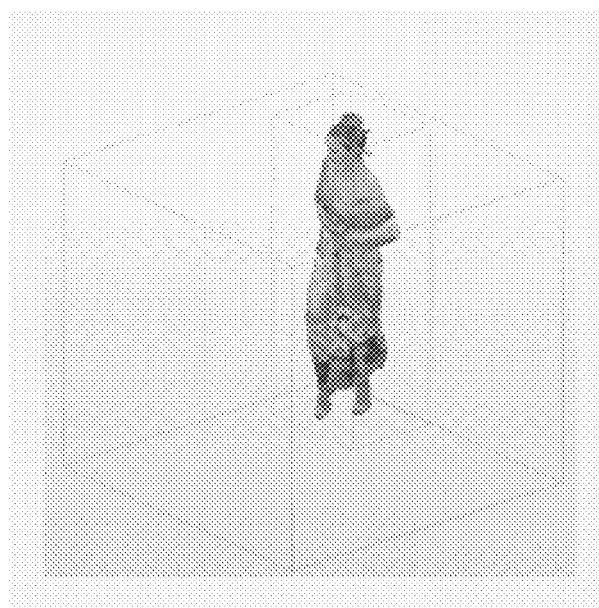
FIG. 1 is a diagram illustrating a three-dimensional (3D) point cloud within a bounding box in a conventional Moving Picture Experts Group-Video-based point cloud compression (MPEG V-PCC)
Figure 2:
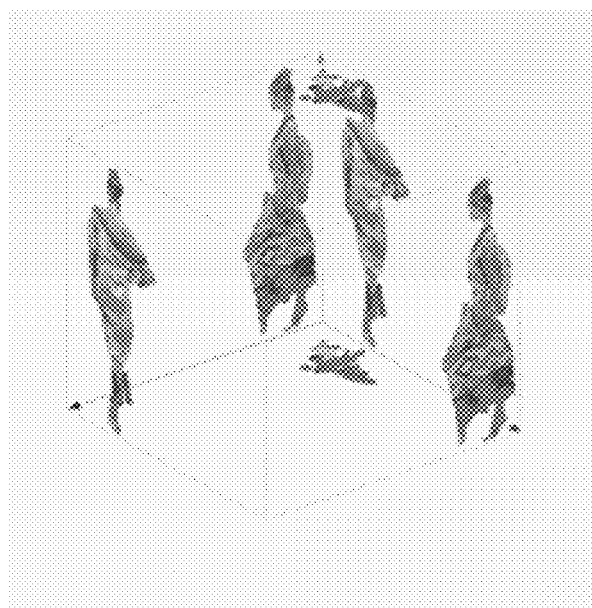
FIG. 2 is a diagram illustrating a state in which patches of a 3D point cloud is acquired.
Figure 3A:
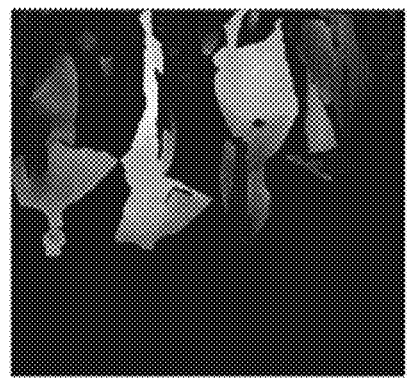
FIGS. 3A, 3B, and 3C show diagrams illustrating a geometry image, a color image, and an occupancy map image for one frame of a 3D point cloud.
Figure 3B:
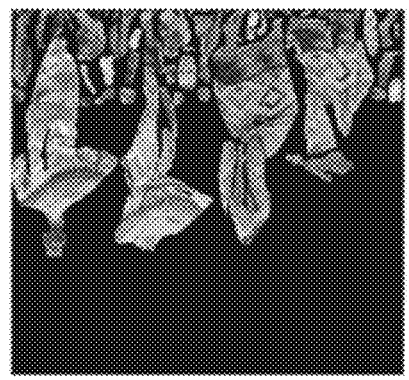
Figure 3C:
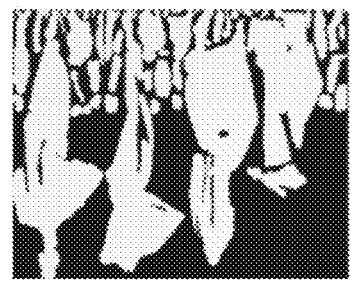
Figure 4:
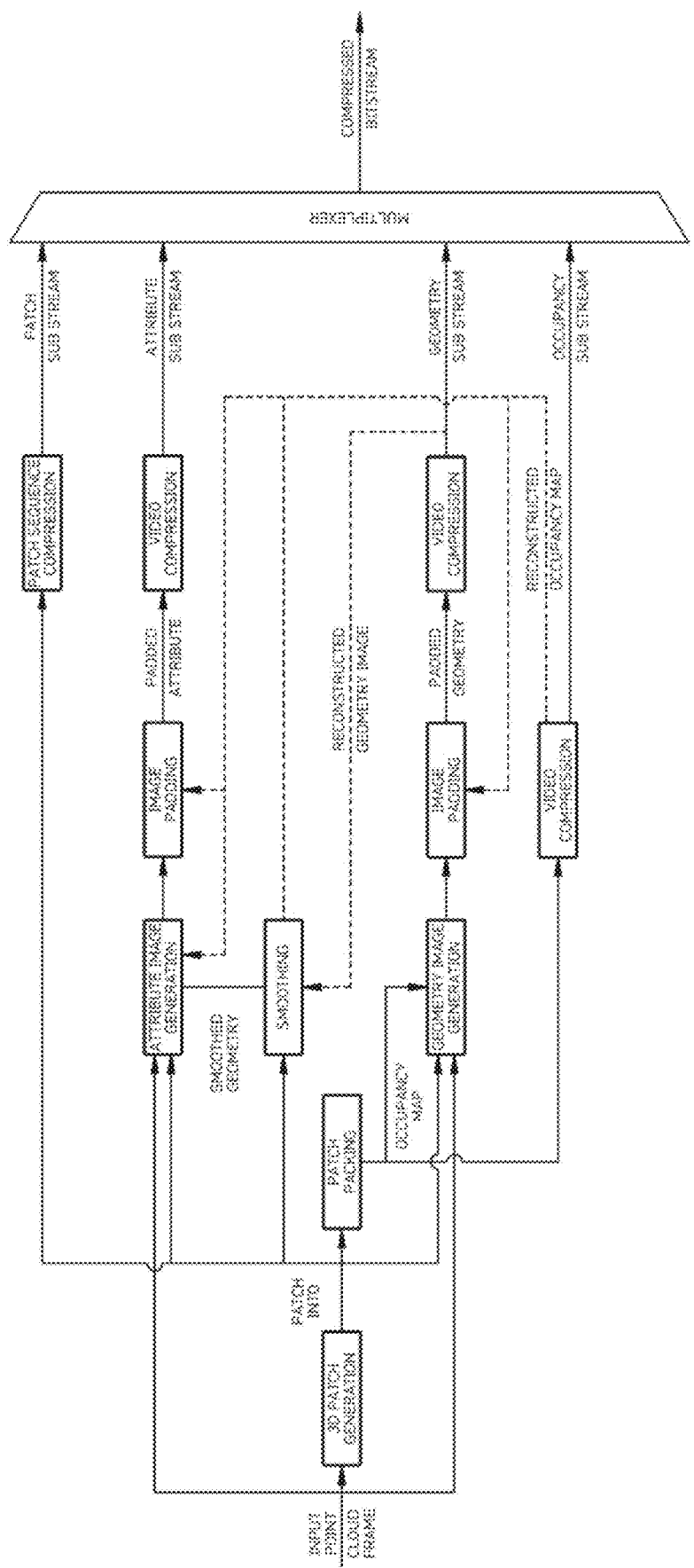
FIG. 4 is a diagram illustrating an encoding structure of the V-PCC.

FIG. 1 is a diagram illustrating a three-dimensional (3D) point cloud within a bounding box in a conventional Moving Picture Experts Group-Video-based point cloud compression (MPEG V-PCC), FIG. 2 is a diagram illustrating a state in which patches of a 3D point cloud is acquired, FIG. 3 shows diagrams illustrating a geometry image, a color image, and an occupancy map image for one frame of a 3D point cloud, FIG. 4 is a diagram illustrating an encoding structure of the V-PCC, and FIG. 5 shows diagrams illustrating reconstructed examples of an occupancy map image that has been compressed using an Essential Video Coding (EVC) codec.

FIG. 1 illustrates an example of a 3D point cloud 'long-dress', which is test data used in the conventional MPEG First, referring to FIG. 1, MPEG V-PCC determines a hexahedral bounding box for each frame of a 3D point cloud to compress a 3D point cloud.

Then, as shown in FIG. 2, each point constituting the 3D point cloud is orthogonally projected to the surface located closest to the 3D point among surfaces of the bounding box so that patches are obtained.

The patches obtained in this way are collected into one image, and a total of three images: a geometry image containing 3D coordinate values for points; a color (attribute) image containing color information of points; and an occupancy map image containing information on whether a corresponding area is a patch are generated as shown in FIG. 3. In this case, information about the acquired patches, such as the type of the projected surface, the size of the patch, and the relative position of the patch is recorded as separate metadata.

The three images are finally compressed through a video codec (video compression) as shown in FIG. 4.

Meanwhile, V-PCC supports both lossy compression and lossless compression of an occupancy map image. An offsetLossyOM parameter used in V-PCC may represent information about which one of a lossless compression and a lossy compression is to be used and a pixel value of an occupied area when generating an occupancy map image, and may have a value in the range of 0 to 255.

Figure 5A:
FIGS. 5A, 5B, 5C, and 5D show diagrams illustrating reconstructed examples of an occupancy map image that has been compressed using an Essential Video Coding (EVC) codec.
Figure 5B:

When lossless compression is desired, the offsetLossyOM value may be set to 0, and when lossy compression is desired in order to reduce the size of a compressed bitstream, the offsetLossyOM value may be set to a value higher than or equal to 1. In addition, the offsetLossyOM parameter indicates the intensity value set for an occupied pixel when generating an occupancy map image. When an offsetLossyOM is 255, the pixel value of areas indicated in white in FIG. 5A is set to 255 when generating an occupancy map image.

The occupancy map image in which the pixel value is set by the offsetLossyOM value is compressed by a video codec, and the compression result is reconstructed to generate "reconstructed occupancy map" information (hereinafter referred to as "a reconstructed occupancy map") during an encoding process as shown in FIG. 4 above.

V-PCC uses a threshold of a thresholdLossyOM parameter when generating the reconstructed occupancy map. In the case of an occupancy map image compressed with lossy compression, since the pixel value may be changed due to compression distortion after the compression, V-PCC uses a threshold, referred to as thresholdLossyOM, to generate a reconstructed occupancy map that identifies occupancy by minimizing the effect of compression distortion.

In more detail, when the pixel value of the decompressed occupancy map image is greater than the thresholdLossyOM value, the pixel is determined as an occupied pixel ('1'), and when the pixel value of the decompressed occupancy map image is less than or equal to the thresholdLossyOM value, the pixel is determined as an unoccupied pixel ('0') so that a reconstructed occupancy map represented by '1' or '0' is generated.

As described above, in order to minimize the effect of compression distortion on the reconstruction of the occupancy map image, the values of the offsetLossyOM parameter and the thresholdLossyOM parameter need to be appropriately set.

Meanwhile, as shown in FIG. 4, V-PCC uses the reconstructed occupancy map during a process of compressing the geometry image and the color image. In this case, when the compression distortion of the reconstructed occupancy map is significant, an error may occur in the compression process of the geometry image.

For example, during the encoding process using a High Efficiency Video Coding (HEVC) codec in TMC2, which is reference software for MPEG, the compression process was stopped by the errors occurred in the compression process of the geometry image. In more detail, there was a case in which a V-PCC encoder (TMC2 v7.2) using a HEVC main profile (HM version 16.20) was unexpectedly stopped during encoding. The environment setting at the time of the experiment including parameters was a HM profile with modified "occupancy-map-ld-main10-lossy.cfg", frameCount=32, occupancyMapQP=41, offsetLossyOM=1, sequence=Cat2-a,b, use3DMC=0, and ctc-r4.

In order to analyze the cause of the stop, an occupancy map reconstructed in the middle of the compression process was inspected and it was observed that the occupancy map was reconstructed without occupied pixels at all. Even though the occupancy map image with 122 patches was inputted, the occupancy map with 0 patches was reconstructed due to excessive compression distortion, and while processing the $122^{nd}$ patch in a 'generatepointcloud' function of a geometry image compression process, the encoding program had stopped due to an error.

FIG. 5, as an example of the above, shows examples in which an occupancy map image is reconstructed when compression is performed using an EVC codec. When an original occupancy map image as shown in FIG. 5A was inputted, and the occupancy map image was compressed by setting a quantization parameter (QP) value, which is a coding parameter, to 38 and using an EVC codec, a reconstructed occupancy map as shown in FIG. 5B was observed.

Figure 5C:
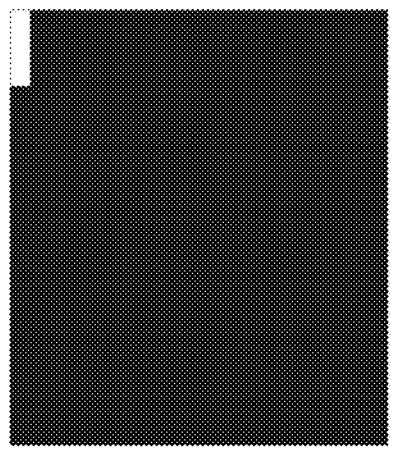
Figure 5D:
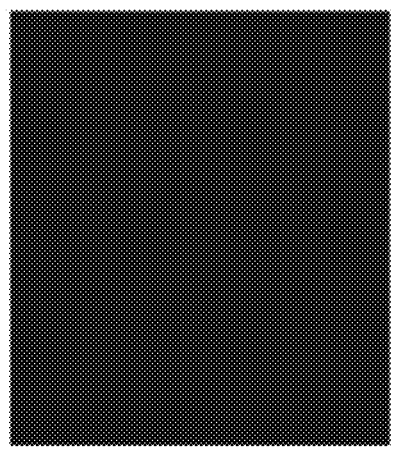

In addition, when the occupancy map image was compressed by setting the QP value, which is an encoding parameter, to 48 and using the EVC codec, a reconstructed occupancy map as shown in FIG. 5C was observed. In this case, even when significant compression distortion can occur and a decoder can decode and reconstruct only a few points or can be stopped, the encoding process may not be stopped. When the compression is performed by setting the QP value, which is the encoding parameter, to 49 and using the EVC codec, a reconstructed occupancy map as shown in FIG. 5D was observed, and in this case, the encoding process was stopped.

In FIG. 4, it has been described that an occupancy map reconstructed during an encoding process is used in the compression process of the geometry image and the color image. In more detail, referring again to FIG. 5D, in a process of compressing the geometry image, when the encoder determines that there is no occupied pixels in a patch area corresponding to each patch of the geometry image, in the reconstructed occupancy map, the encoder skips subsequent processes to be performed on the corresponding patch.

Therefore, when a reconstructed occupancy map image (see FIG. 5D), in which the occupancy map has complete loss due to compression distortion, is provided, compressed geometry image information for the corresponding frame is not generated, and an interruption occurs while the program is running.

The present invention has been proposed to solve the above-described constraints, and according to an embodiment of the present invention, a method of compressing an occupancy map of a 3D point cloud is provided.

FIG. 6 is a diagram illustrating a method of compressing an occupancy map of a 3D point cloud in a sequential order according to an embodiment of the present invention. In particular, FIG. 6 is a diagram illustrating a process of compressing an occupancy map image using a compression quality-based occupancy map image recompression method.

Referring to FIG. 6, first, a processor receives an occupancy map indicating whether each pixel is occupied and an offsetLossyOM parameter indicating an intensity value set for an occupied pixel and generates an occupancy map image (S601), and the processor compresses the occupancy map image generated in operation S601 through a video codec using a preset QP value (S602).

Next, the processor decompresses the occupancy map image compressed through the video codec in operation S602 to generate a decompressed occupancy map image (S603), and the processor compares the decompressed occupancy map image generated in operation S603 with the original occupancy map image generated in operation S601 to calculate a peak signal-to-noise ratio (PSNR) value (S604).

In addition, the processor compares the PSNR value calculated in operation S604 with a PSNR threshold set by a user (S605). When the calculated PSNR value is greater than or equal to the PSNR threshold, the operation of the processor is finished, and when the calculated PSNR value is less than the PSNR threshold, the processor adjusts a QP value to be lower than or equal to a preset value (S606).

In addition, the processor recompresses the occupancy map image generated in operation S601 using the QP value adjusted to decrease through the video codec (S607).

Meanwhile, the degree to which the QP value is adjusted may be changed by the user without limitation.

Next, the processor decompresses the occupancy map image recompressed through the video codec in operation S607 to generate a re-decompressed occupancy map image (S608).

Next, the processor applies a threshold, which is referred to as thresholdLossyOM, to the re-decompressed occupancy map image. In response to a pixel value being greater than the thresholdLossyOM value, the processor determines the corresponding pixel as an occupied pixel '1', and in response to a pixel value being less than or equal to the thresholdLossyOM value, the processor determines the corresponding pixel as an unoccupied pixel '0' so that a reconstructed occupancy map represented by '1' or '0' is generated.

Next, FIG. 7 is a diagram illustrating a method of compressing an occupancy map of a 3D point cloud in a sequential order according to another embodiment of the present invention, and in particular, shows an example of using a method of compressing an occupancy map image using a patch-by-patch inspection-based occupancy map image recompression method.

Referring to FIG. 7, first, the processor receives an occupancy map indicating whether each pixel is occupied and an offsetLossyOM parameter indicating an intensity value set for an occupied pixel and generates an occupancy map image (S701), and the processor compresses the occupancy map image generated in operation S701 through a video codec using a preset QP value (S702).

Next, the processor decompresses the occupancy map image compressed through the video codec in operation S702 to generate a decompressed occupancy map image (S703), and the processor inspects each patch of the decompressed occupancy map image generated in operation S703 to check whether an occupied pixel exists in the corresponding patch (S704). In this process, the processor applies a thresholdLossyOM threshold to determine an occupied pixel in response to the pixel value of the decompressed occupancy map image being greater than the thresholdLossyOM value and to determine an unoccupied pixel in response to the pixel value being less than or equal to the thresholdLossyOM value.

Next, the processor determines whether one or more patches with no occupied pixels exist as a result of the inspection in operation S704 (S705). When a result of the determination is that there is no patch with no occupied pixels, the operation of the processor is finished, and when a result of the determination is that there is a patch with no occupied pixels, the QP value is adjusted to decrease (S706).

Next, the processor recompresses the occupancy map image generated in operation S701 through the video codec using the QP value adjusted to decrease (S707).

Next, the processor decompresses the occupancy map image recompressed through the video codec in operation S707 to generate a re-decompressed occupancy map image (S708).

Next, the processor applies a threshold, which is referred to as thresholdLossyOM, to the re-decompressed occupancy map image. In response to a pixel value being greater than the thresholdLossyOM value, the processor determines the corresponding pixel as an occupied pixel '1', and in response to a pixel value being less than or equal to the thresholdLossyOM value, the processor determines the corresponding pixel as an unoccupied pixel '0' so that a reconstructed occupancy map represented by '1' or '0' is generated (S709).

Next, FIG. 8 is a diagram illustrating a method of compressing an occupancy map of a 3D point cloud in a sequential order according to still another embodiment of the present invention, and in particular, shows an example of using a method of regenerating and recompressing an occupancy map image based on a compression quality.

Referring to FIG. 8, first, the processor receives an occupancy map indicating whether each pixel is occupied and an offsetLossyOM parameter indicating an intensity value set for an occupied pixel and generates an occupancy map image (S801), and the processor compresses the occupancy map image generated in operation S801 through a video codec using a preset QP value (S802).

Next, the processor decompresses the occupancy map image compressed through the video codec in operation S802 to generate a decompressed occupancy map image (S803), and the processor compares the decompressed occupancy map image generated in operation S803 with the original occupancy map image generated in operation S801 to calculate a peak signal-to-noise ratio (PSNR) value (S804).

In addition, the processor compares the calculated PSNR value with a PSNR threshold set by a user (S805). When the calculated PSNR value is greater than or equal to the preset PSNR threshold, the operation of the processor is finished, and when the calculated PSNR value is less than the PSNR threshold, the processor adjusts the offsetLossyOM value to increase and regenerates the occupancy map image according to the reset offsetLossyOM value (S806).

Next, the processor recompresses the occupancy map image regenerated in operation S806 through the video codec using the QP value (S807).

Next, the processor decompresses the occupancy map image recompressed through the video codec in operation S807 to generate a re-decompressed occupancy map image (S808).

Next, the processor applies a threshold, which is referred to as thresholdLossyOM, to the re-decompressed occupancy map image. In response to a pixel value being greater than the thresholdLossyOM value, the processor determines the corresponding pixel as an occupied pixel '1', and in response to a pixel value being less than or equal to the thresholdLossyOM value, the processor determines the corresponding pixel as an unoccupied pixel '0' so that a reconstructed occupancy map represented by '1' or '0' is generated (S809).

Next, FIG. 9 is a diagram illustrating a method of compressing an occupancy map of a 3D point cloud in a sequential order according to yet another embodiment of the present invention, and in particular shows an example of using a method of regenerating and recompressing an occupancy map image based on a patch-by-patch inspection.

Referring to FIG. 9, first, the processor receives an occupancy map indicating whether each pixel is occupied and an offsetLossyOM parameter indicating an intensity value set for an occupied pixel and generates an occupancy map image (S901), and the processor compresses the occupancy map image generated in operation S901 through a video codec using a preset QP value (S902).

Next, the processor decompresses the occupancy map image compressed through the video codec in operation S902 to generate a decompressed occupancy map image (S903), and the processor inspects each patch of the decompressed occupancy map image generated in operation S903 to check whether an occupied pixel exists in the corresponding patch (S904). In this process, the processor applies a thresholdLossyOM threshold to determine an occupied pixel in response to the pixel value of the decompressed occupancy map image being greater than the thresholdLossyOM value and to determine an unoccupied pixel in response to the pixel value being less than or equal to the thresholdLossyOM value.

Next, the processor determines whether one or more patches with no occupied pixels exist as a result of the inspection in operation S904 (S905). When a result of the determination is that there is no patch with no occupied pixels, the operation of the processor is finished, and when a result of the determination is that there is a patch with no occupied pixels, the processor adjusts the offsetLossyOM value to increase and regenerates the occupancy map image according to the reset offsetLossyOM value (S906).

Next, the processor recompresses the occupancy map image generated in operation S906 through the video codec using the QP value (S907).

Next, the processor decompresses the occupancy map image recompressed through the video codec in operation S907 to generate a re-decompressed occupancy map image (S908).

Next, the processor applies a threshold, which is referred to as thresholdLossyOM, to the re-decompressed occupancy map image. In response to a pixel value being greater than the thresholdLossyOM value, the processor determines the corresponding pixel as an occupied pixel '1', and in response to a pixel value being less than or equal to the thresholdLossyOM value, the processor determines the corresponding pixel as an unoccupied pixel '0' so that a reconstructed occupancy map represented by '1' or '0' is generated (S909).

Next, FIG. 10 is a diagram illustrating a method of compressing an occupancy map of a 3D point cloud in a sequential order according to yet another embodiment of the present invention, and in particular, shows a method of compressing an occupancy map image based on a compression quality.

Referring to FIG. 10, first, the processor receives an occupancy map indicating whether each pixel is occupied and an offsetLossyOM parameter indicating an intensity value set for an occupied pixel and generates an occupancy map image (S1001), and the processor compresses the occupancy map image generated in operation S1001 through a video codec using a preset QP value (S1002).

Next, the processor decompresses the occupancy map image compressed through the video codec in operation S1002 to generate a decompressed occupancy map image (S1003), and the processor compares the decompressed occupancy map image generated in operation S1003 with the original occupancy map image generated in operation S1001 to calculate a peak signal-to-noise ratio (PSNR) value (S1004).

In addition, the processor compares the PSNR value calculated in operation S1004 with a PSNR threshold set by a user (S1005). When the calculated PSNR value is greater than or equal to the PSNR threshold, the operation of the processor is finished, and when the calculated PSNR value is less than the PSNR threshold, the processor adjusts the thresholdLossyOM value to decrease (S1006).

Next, the processor applies a threshold which is referred to as thresholdLossyOM and adjusted to decrease in operation S1006. In response to a pixel value being greater than the thresholdLossyOM value, the processor determines the corresponding pixel as an occupied pixel '1', and in response to a pixel value being less than or equal to the thresholdLossyOM value, the processor determines the corresponding pixel as an unoccupied pixel '0' so that a reconstructed occupancy map represented by '1' or '0' is generated (S1007).

FIG. 11 is a diagram illustrating a method of compressing an occupancy map of a 3D point cloud in a sequential order according to yet another embodiment of the present invention and shows a method of compressing an occupancy map image based on a patch-by-patch inspection.

Referring to FIG. 11, first, the processor receives an occupancy map indicating whether each pixel is occupied and an offsetLossyOM parameter indicating an intensity value set for an occupied pixel and generates an occupancy map image (S1101), and the processor compresses the occupancy map image generated in operation S1101 through a video codec using a preset QP value (S1102).

Next, the processor decompresses the occupancy map image compressed through the video codec in operation S1102 to generate a decompressed occupancy map image (S1103), and the processor inspects each patch of the decompressed occupancy map image generated in operation S1103 to check whether an occupied pixel exists in a corresponding patch (S1104). In this process, the processor applies a thresholdLossyOM threshold to determine an occupied pixel in response to the pixel value of the decompressed occupancy map image being greater than the thresholdLossyOM value and to determine an unoccupied pixel in response to the pixel value being less than or equal to the thresholdLossyOM value.

Next, the processor determines whether one or more patches with no occupied pixels exist as a result of the inspection through operation S1104 (S1105). The processor, when a result of the determination is that there is no patch with no occupied pixels, the operation of the processor is finished, and when a result of the determination is that there is a patch with no occupied pixels, the processor adjusts the thresholdLossyOM value to decrease (S1006).

Next, the processor applies a threshold which is referred to as thresholdLossyOM and adjusted to decrease in operation S1106. In response to a pixel value being greater than the thresholdLossyOM value, the processor determines the corresponding pixel as an occupied pixel '1', and in response to a pixel value being less than or equal to the thresholdLossyOM value, the processor determines the corresponding pixel as an unoccupied pixel '0' so that a reconstructed occupancy map represented by '1' or '0' is generated (S1107).

Meanwhile, the method of compressing an occupancy map of a 3D point cloud according to the embodiment of the present invention may be implemented in a computer system or recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method of compressing an occupancy map of a 3D point cloud according to the embodiment of the present invention may be implemented in a computer-executable form. When the method of compressing an occupancy map of a 3D point cloud according to the embodiment of the present invention is performed by the computer, instructions readable by the computer may perform the method of compressing an occupancy map of a 3D point cloud according to the embodiment of the present invention.

Meanwhile, the method of compressing an occupancy map of a 3D point cloud according to the embodiment of the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

As is apparent from the above, the present invention minimizes compression distortion when reconstructing a compressed occupancy map image so that the quality of a reconstructed occupancy map image can be remarkably improved.

The present invention can be collectively applicable to various codecs to minimize problems caused by compression quality degradation of an occupancy map in a process of applying various video codecs, such as EVC, AVC, and VVC, in a situation in which a compression loss level of the occupancy map is unpredictable and recommended setting values of an offsetLossyOM parameter and a thresholdLossyOM parameter for each video codec are unknown.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of compressing an occupancy map of a three-dimensional (3D) point cloud, the method comprising the steps of:
    (a) generating an occupancy map image using occupancy map information, compressing the occupancy map image using a video codec, and decompressing the compressed occupancy map image; and
    (b) recompressing the occupancy map image generated in the step (a) in consideration of at least one of a user-specified compression quality and a patch-by-patch inspection result of the occupancy map image decompressed in the step (a);
    wherein the step (b) includes, in consideration of the patch-by-patch inspection result, inspecting whether an occupied pixel exists for each patch of the occupancy map image decompressed in the step (a) and, in response to existence of a patch having no occupied pixels, lowering a quantization parameter (QP) value for the decompressed occupancy map image to be less than or equal to a preset value and recompressing the occupancy map image generated in the step (a).

2. The method of claim 1, wherein the step (a) includes generating the occupancy map image on the basis of an offsetLossyOM parameter indicating an intensity value set for an occupied pixel in the occupancy map.

3. The method of claim 1, wherein the step (b) includes, in consideration of the compression quality, comparing the occupancy map image decompressed in the step (a) with the occupancy map image generated in the step (a) to calculate a peak signal-to-noise ratio (PSNR) value, identifying whether the calculated PSNR value is less than a preset PSNR threshold, and when the calculated PSNR value is less than the PSNR threshold, lowering a quantization parameter (QP) value for the decompressed occupancy map image to be less than or equal to a preset value and recompressing the occupancy map image generated in the step (a).

4. A method of compressing an occupancy map of a three-dimensional (3D) point cloud, the method comprising the steps of:
    (a) generating an occupancy map image using occupancy map information, compressing the occupancy map image using a video codec, and decompressing the compressed occupancy map image; and
    (b) regenerating an occupancy map image in consideration of at least one of a user-specified compression quality or a patch-by-patch inspection result of the occupancy map image decompressed in the step (a) and recompressing the regenerated occupancy map image;
    wherein the step (b) includes, in consideration of the compression quality, comparing the occupancy map image decompressed in the step (a) with the occupancy map image generated in the step (a) to calculate a peak signal-to-noise ratio (PSNR) value, identifying whether the calculated PSNR value is less than a preset PSNR threshold, and when the calculated PSNR value is less than the PSNR threshold, regenerating the occupancy map image by increasing an offsetLossyOM parameter to a preset value and recompressing the regenerated occupancy map image.

5. A method of compressing an occupancy map of a three-dimensional (3D) point cloud, the method comprising the steps of:
    (a) generating an occupancy map image using occupancy map information, compressing the occupancy map image using a video codec, and decompressing the compressed occupancy map image; and
    (b) regenerating an occupancy map image in consideration of at least one of a compression quality or a patch-by-patch inspection result of the occupancy map image decompressed in the step (a) and recompressing the regenerated occupancy map image;
    wherein the step (b) includes, in consideration of the patch-by-patch inspection result, inspecting whether an occupied pixel exists for each patch of the occupancy map image decompressed in the step (a) and, in response to existence of a patch having no occupied pixels, regenerating the occupancy map image by increasing an offsetLossyOM parameter to a preset value and recompressing the regenerated occupancy map image.

6. A method of compressing an occupancy map of a three-dimensional (3D) point cloud, the method comprising the steps of:
    (a) generating an occupancy map image using occupancy map information, compressing the occupancy map image using a video codec, and decompressing the compressed occupancy map image; and
    (b) resetting a thresholdLossyOM parameter to be decreased to a preset value in consideration of at least one of a user-specified compression quality or a patch-by-patch inspection result of the occupancy map image decompressed in the step (a);
    wherein the step (b) includes, in consideration of the compression quality, comparing the occupancy map image decompressed in the step (a) with the occupancy map image generated in the step (a) to calculate a peak signal-to-noise ratio (PSNR) value, identifying whether the calculated PSNR value is less than a preset PSNR threshold, and when the calculated PSNR value is less than the PSNR threshold, resetting the thresholdLossyOM parameter to be decreased to a preset value.

7. A method of compressing an occupancy map of a three-dimensional (3D) point cloud, the method comprising the steps of:
  (a) generating an occupancy map image using occupancy map information, compressing the occupancy map image using a video codec, and decompressing the compressed occupancy map image; and
  (b) resetting a thresholdLossyOM parameter to be decreased to a preset value in consideration of at least one of a compression quality or a patch-by-patch inspection result of the occupancy map image decompressed in the step (a),
  wherein the step (b) includes, in consideration of the patch-by-patch inspection result, inspecting whether an occupied pixel exists for each patch of the occupancy map image decompressed in the step (a) and, in response to existence of a patch having no occupied pixels, resetting the thresholdLossyOM parameter to be decreased to a preset value.

* * * * *